United States Patent [19]

Hayashi et al.

[11] Patent Number: 4,519,343
[45] Date of Patent: May 28, 1985

[54] ENGINE COOLING SYSTEM

[75] Inventors: Masaharu Hayashi, Toyota; Syunzo Tsuchikawa, Ichinomiya; Masato Itakura, Toyota, all of Japan

[73] Assignee: Aisin Seiki Kabushiki Kaisha, Kariya, Japan

[21] Appl. No.: 548,098

[22] Filed: Nov. 2, 1983

[30] Foreign Application Priority Data

Nov. 8, 1982 [JP] Japan .............................. 57-195628
Nov. 8, 1982 [JP] Japan ........................... 57-168975[U]
Nov. 8, 1982 [JP] Japan ........................... 57-168976[U]

[51] Int. Cl.³ .............................................. F01P 5/06
[52] U.S. Cl. .................................. 123/41.49; 123/41.65
[58] Field of Search ............... 123/41.11, 41.12, 41.31, 123/41.49, 41.57, 41.58, 41.59, 41.62, 41.65, 41.7; 180/68.1, 68.4

[56] References Cited

U.S. PATENT DOCUMENTS 3,398,882  8/1968  Zenkner ............................... 230/125
4,133,185  1/1979  Dickey ............................... 123/41.12
4,376,424  3/1983  Mazur ................................ 123/41.49

Primary Examiner—William A. Cuchlinski, Jr.
Attorney, Agent, or Firm—Oblon, Fisher, Spivak, McClelland & Maier

[57] ABSTRACT

An engine cooling system for an automotive vehicle has a cross-flow fan driven by a motor coupled thereto for producing an air flow through a radiator disposed in front of the cross-flow fan. The cross-flow fan is housed in a casing assembly composed of an upper casing, a lower casing, and a pair of lateral casings for guiding the air flow through the cross-flow fan. The upper casing has a curved portion covering a portion of the cross-flow fan for preventing an air flow from counteracting rotation of the fan. Means may be provided for retractably covering the portion of the fan to prevent the counteracting air flow only when the automotive vehicle runs at a certain speed or higher. Such means comprises a triangular portion of the upper casing hinged for angular movement between a fan covering position and a position to define an additional air flow passage. Alternatively, the means comprises a coiled resilient member having one end retractably extending through the upper casing in the vicinity of the fan. According to other embodiments, a plurality of vertically spaced cross-flow fans are housed respectively by a plurality of vertically arranged casing assemblies.

10 Claims, 9 Drawing Figures

ENGINE COOLING SYSTEM

BACKGROUND OF THE INVENTION

1. Field of the Invention

The present invention relates to an engine cooling system, and more particularly to an engine cooling system including a cross-flow or tangential fan or fans driven by a motor for cooling an engine on an automotive vehicle.

2. Description of the Prior Art

FIG. 1 of the accompanying drawings illustrates an engine cooling system for use in an automotive vehicle having an engine 2 disposed in a front nose portion 1. The engine cooling system includes a cross-flow or tangential fan 4 driven through an endless belt 3 by the engine 2 to rotate in the direction of the arrow a. A radiator 5 is disposed at the front end of the nose portion 1 in front of the cross-flow fan 4 and subjected to an air flow in the direction of the arrow b while the vehicle is running. Upper and lower casings 6, 7 extend rearward from the upper and lower ends, respectively, of the radiator 5 in partly covering relation to the cross-flow fan 4 for guiding the air flow from the radiator 5 to the cross-flow fan 4. Designated at W is a front wheel of the vehicle.

The cross-flow fan 4 has a shaft 4a supported by the casing 6 or 7 (that is, a body member of the vehicle), and the shaft 4a is operatively coupled by the endless belt 3 to the engine 2. Therefore, the fan shaft 4a is subjected to vibrations of the engine 2 and also vibrations of the vehicle body when the vehicle travels. Since the casings 6, 7 undergo vibrations of the vehicle body only, the casings 6, 7 and the fan 4 move relatively to each other. The casings 6, 7 and the fan 4 are spaced from each other with as small a distance therebetween as possible to increase the speed of travel of the air flow and keep a desired rate of air flow for higher engine cooling efficiency. This however has led to a problem in that the the casings 6, 7 tend to contact the fan 4 when they are relatively moved, thus damaging the fan 4. If the casings 4, 7 were spaced widely from the fan 4 in order to prevent the latter from being damaged, no desired rate of air flow could be achieved and the engine cooling efficiency could not be increased.

The cross-flow fan 4 is also partly covered by lateral casings (not shown in FIG. 1) to avoid any unwanted reduction in the efficiency of the fan while the vehicle is being driven at medium and high speeds. When the vehicle is idling or running at low speeds, however, the casings covering the fan are liable to obstruct an air flow directed to the fan, with the result that no sufficient rate of air flow cannot be assured and the engine cooling efficiency is lowered.

Various arrangements have been known for increasing the rate of air flow through the radiator to thereby cool the coolant for cooling the engine. For example, the cross-flow fan has an increased outside diameter and a larger axial length. This attempt is disadvantageous in that a large installation space in longitudinal and transverse directions should be provided in a small engine compartent for accommodating such a cross-flow fan. However, in reality, no sufficient installation space cannot be obtained in the longitidinal and transverse directions, though a small vertical space is available in the engine compartment. Another effort has been to increase the RPM of the cross-flow fan during operation. This arrangement has a drawback in that the cross-flow fan is subjected to an undue load and rendered less durable since a cross-flow fan of a capacity large enough to withstand the desired high RPM cannot be installed in actual applications.

SUMMARY OF THE INVENTION

It is an object of the present invention to provide an engine cooling system including a separate motor for driving a cross-flow fan disposed behind a radiator to prevent engine vibrations from being transmitted to the fan or fans, so that the cross-flow fan or fans and casings can be maintained in a relative positional relationship for protecting the fan or fans against damage.

Another object of the present invention is to provide an engine cooling system having a fan cover movable away from a cross-flow fan while an automobile is idling or running at low speeds and also movable into covering relation to the fan while the automobile is running at medium and high speeds, for thereby providing an optimum engine cooling capability.

Still another object of the present invention is to provide an engine cooling system including a plurality of cross-flow fans arranged vertically in an engine compartment of an automobile for increasing a rate of air flow through a radiator to thereby improve an engine cooling efficiency and prevent the engine from overheating.

According to the present invention, there is provided an engine cooling system for an automotive vehicle, including a cross-flow fan drivable by a motor coupled thereto for creating an air flow through a radiator disposed in front of the cross-flow fan, and a casing assembly accommodating the cross-flow fan and composed of an upper casing, a lower casing, and a pair of lateral casings for guiding the air flow through the cross-flow fan. The upper casing has a curved portion covering a portion of the cross-flow fan for preventing an air flow from counteracting rotation of the fan. Means may be provided for retractably covering the portion of the fan to prevent the counteracting air flow only when the automotive vehicle runs at a certain speed or higher. Such means comprises a triangular portion of the upper casing hinged for angular movement between a fan covering position and a position to define an additional air flow passage. Alternatively, the means comprises a coiled resilient member having one end retractably extending through the upper casing in the vicinity of the fan. According to other embodiments, a plurality of vertically spaced cross-flow fans are housed respectively by a plurality of vertically arranged casing assemblies. The engine cooling system can protect the cross-flow fan from being damaged by the casing assembly since the fan is driven by the motor independent from the engine of the automotive vehicle, and is capable of producing a high rate of air flow through the radiator.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
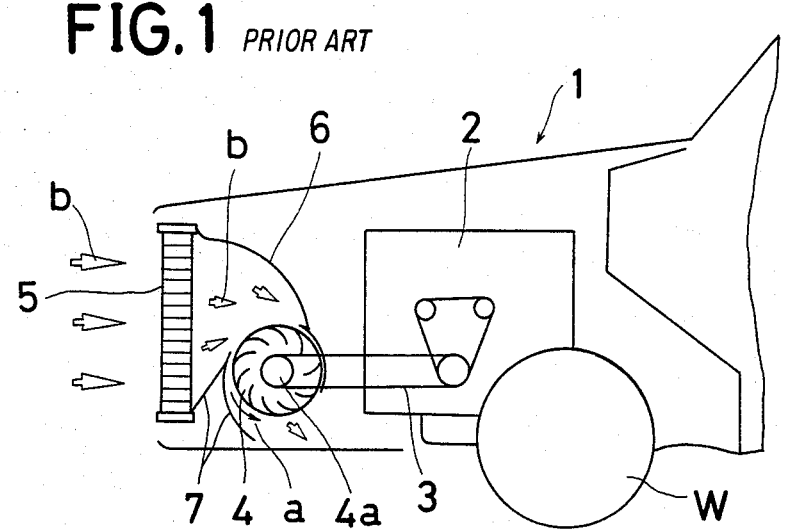
FIG. 1 is a schematic cross-sectional view of a front portion of an automotive vehicle incorporating a conventional engine cooling system.

An engine cooling system according to an embodiment of the present invention will be described with reference to FIGS. 2 and 3. Identical or corresponding parts in FIG. 1 are denoted by identical or corresponding reference characters in FIGS. 2 and 3. A cross-flow or tangential fan 4 has a shaft 4a rotatable about its own axis O by a DC motor 11 (FIG. 3) coupled directly or through a mechanical coupling to an end of the shaft 4a. The DC motor 11 may comprise a flat motor or a cylinder motor. The RPM of the motor 11 is controlled by a motor control system including an engine coolant temperature sensor S1 and a compressor high-pressure sensor S2. The engine coolant temperature sensor S1 is attached to a pipe for passage therethrough of a coolant for cooling the engine 2 for energizing the motor 11 to provide a desired rate of air flow in response to a certain temperature of the engine coolant. The compressor high-pressure sensor S2 is sensitive to the pressure in an air-conditioning compressor for turning on the motor 11 to provide a desired rate of air flow when the compressor pressure exceeds a certain level. The cross-flow fan 4 is thus controlled in RPM by the foregoing sensors S1, S2 to prevent the engine 2 from being heated or cooled excessively.

Figure 2:
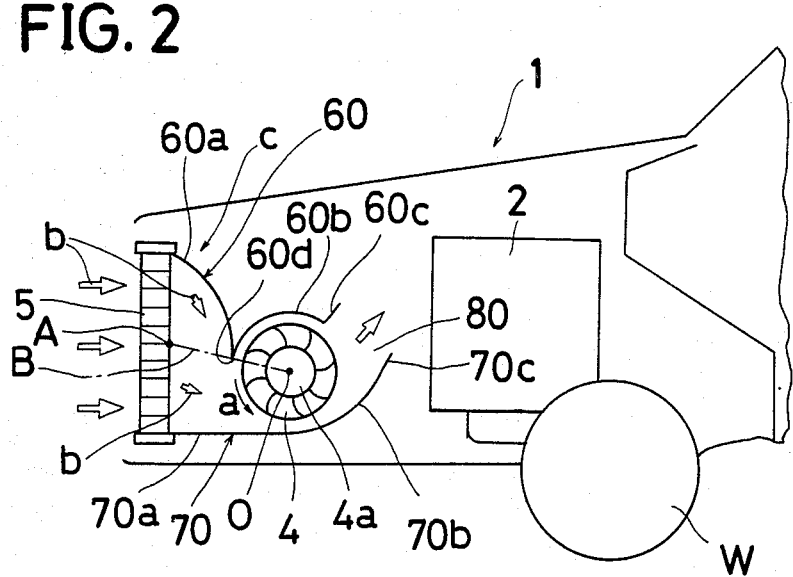
FIG. 2 is a schematic cross-sectional view of a front portion of an automotive vehicle incorporating an engine cooling system according to an embodiment of the present invention.
Figure 3:
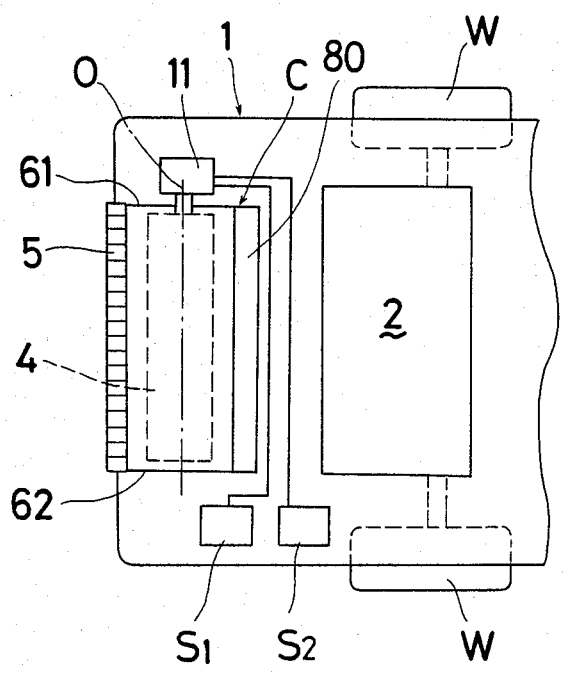
FIG. 3 is a schematic plan view of the engine cooling system shown in FIG. 2.

The cross-flow fan 4 is housed in a casing assembly C comprising an upper casing 60, a lower casing 70, and lateral casings 61, 62 (FIG. 3). The upper casing 60 extends rearward from the upper end of a radiator 5 and is composed of a front curved portion 60a, a central curved portion 60b, and a rear outlet portion 60c. The front and central curved portions 60a, 60b are joined together by a downwardly projecting edge 60d. The front curved portion 60a serves to guide an air flow having passed through the radiator 5 toward the fan 4 while the automobile is running. The central curved portion 60b covers an upper portion of the fan 4 to prevent the introduced air flow from contacting the upper portion of the fan 4. If the air flow hits the upper portion of the fan 4 as it turns counterclockwise as shown in FIG. 2, the speed of rotation of the fan 4 would be reduced. In particular, while the vehicle is running at high speeds, the fan 4 would be stopped or rotated clockwise by such air flow hitting the upper portion thereof, with the result that no air would flow through the core of the radiator, reducing the engine cooling efficiency. The downwardly projecting edge 60d is positioned on a straight line B connecting between a vertically central point A on the radiator 5 and the axis O of the shaft 4a, or below that line B to cover a larger portion of the fan 4.

The lower casing 70 extends rearward from the lower end of the radiator 5 and comprises a front straight portion 70a, a central curved portion 70b covering a lower portion of the fan 4, and a rear outlet portion 70c extending obliquely upwardly.

Operation of the engine cooling system of the foregoing construction will now be described. When the engine 2 and the motor 11 are started with the automobile remaining at rest, the cross-flow fan 4 rotates in the counterclockwise in the direction of the arrow a (FIG. 2). Air is drawn through the radiator 5 in the direction of the arrow b and discharged by the fan 4 through the casing assembly C out of an outlet 80 formed by the outlet portions 60c, 70c.

When the automobile starts running, the speed of air flow in the direction of the arrow b is relatively increased. The air is introduced at quite a high speed especially when the automobile travels at a high speed. The downwardly projecting edge 60d located on the line B or therebelow prevents the air flow from subjecting the fan 4 to a moment in a direction opposite to the direction of the arrow a, but instead enables the air flow to assist the fan 4 in rotating at a higher speed. Accordingly, the engine cooling efficiency can be increased.

The motor 11 is controlled, as described above, by the engine coolant temperature sensor S1 and the compressor high-pressure sensor S2 to rotate at an RPM for providing an engine cooling efficiency best suited for certain engine operating conditions.

While in the embodiment of FIGS. 2 and 3 the cross-flow fan 4 is rotated counterclockwise in the direction of the arrow a, it may be rotated clockwise with the casing assembly C arranged upside down.

With the foregoing arrangement, no vibrations from the engine, but only vibrations from the vehicle body are transferred to the cross-flow fan, so that the latter will be prevented from being brought into contact with the casings for protection against damage. Therefore, the casings and the cross-flow fan can be spaced at a small distance from each other for an increased rate of air flow therethrough and hence an improved engine cooling efficiency. Since the cross-flow fan is driven by the separate motor, no viscous-fluid coupling is required for controlling the RPM of the fan, and no bearing such as a bearing bracket is necessary therefor. The cross-flow fan is controlled in RPM by the engine coolant temperature sensor and the compressor high-pressure sensor which do not takeup a large space in the engine compartment. Thus, the engine cooling system of the above embodiment is of particular advantage for use in a small space such as an engine compartment.

Where a cross-flow fan is driven by an engine as in the prior art, the fan and the engine need to be located closely to each other, and the engine should be mounted transversely (as for a front-wheel drive) as the fan shaft must extend parallel to the engine crank shaft. According to the present invention, however, the engine cooling system with its cross-flow fan driven by its own motor may be used with any engine installation types, such as a front engine, a rear engine, a transversely mounted engine, or a longitudinally mounted engine.

Figure 4:
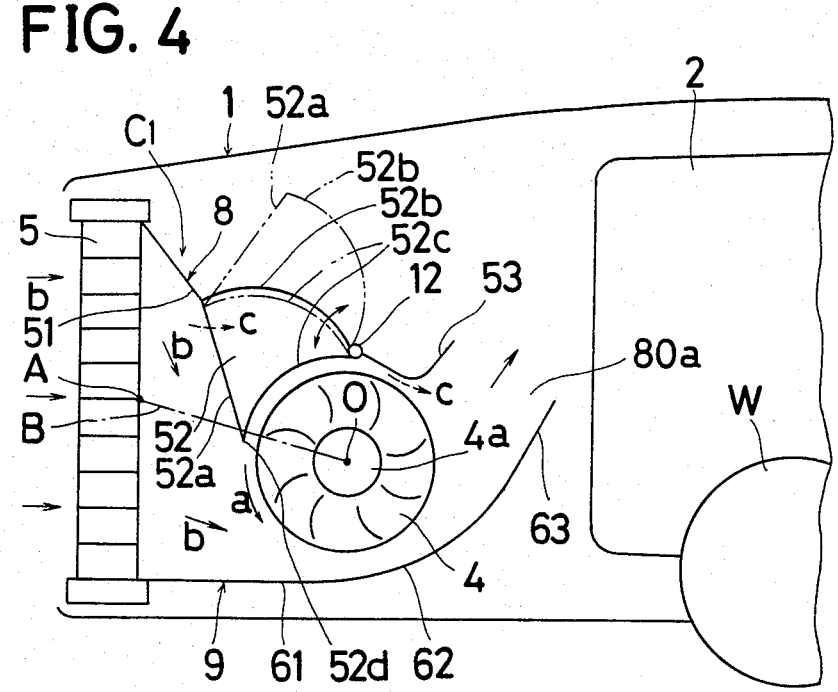
FIGS. 4 through 9 are schematic cross-sectional views of front portions of automotive vehicles incorporating engine cooling systems according to other embodiments of the present invention.

FIG. 4 shows an engine cooling system according to another embodiment. The engine cooling system includes a cross-flow fan 4 having a shaft 4a rotatable about its own axis O by a motor (not shown) coupled to an end of the shaft 4a. The engine cooling system also has a casing assembly C1 composed of an upper casing 8, a lower casing 9, and lateral casings (not shown) which are coupled together in surrounding relation to the cross-flow fan 4. The upper casing 8 extends rearward from the upper end of the radiator 5 and includes a front straight portion 51, a central swingable portion 52 of a substantially triangular shape (as viewed in side elevation), and a rear outlet portion 53. The central swingable portion 52 is composed of a front straight portion 52a, an upper curved portion 52b, and a lower curved portion 52c. The upper casing 8 has a width transverse of the vehicle body such that it covers an upper portion of the cross-flow fan 4. The swingable portion 52 is angularly movable about a hinge 12 in the directions of the arrowheads between an upper position indicated by the two-dot-and-dash line when the automobile is running at low speeds or in an engine idling mode, and a lower position indicated by the solid line when the automobile is running at medium and high speeds. The swingable portion 52 may be driven by any suitable drive mechanism such as a hydraulic, vacuum, or electric drive mechanism. The swingable portion 52 is angularly displaced from the two-dot-and-dash-line position to the solid-line position when the aubomobile runs at a certain speed (about 40 km/h.) as detected by a car speed sensor (not shown). The swingable portion 52 has a downwardly projecting edge 52d which, when the swingable portion 52 is in the solid-line lower position, is located on a straight line B connecting between the vertical center A of the radiator 5 and the axis O of the fan shaft 4a or therebelow.

The lower casing 9 extends rearward from the lower end of the radiator 5 and includes a front straight portion 61, a central curved portion 62, and a rear outlet portion 63 extending obliquely upwardly. The rear outlet portions 53, 63 of the upper and lower casings 3, 9 jointly constitute an air flow outlet 80a.

The engine cooling system shown in FIG. 4 operates as follows: When the engine 2 is started and the fan motor is energized, and the automobile is kept at rest, the cross-flow fan 4 rotates counterclockwise to draw air through the radiator 5 in the direction of the arrow b and discharge air out of the outlet 80a. Since the swingable portion 52 of the upper casing 8 is in the upper position at this time, the air coming through the radiator 5 also flows in the direction of the arrow c.

As the automobile starts moving, the speed of air flow in the direction of the arrow b is relatively increased, and becomes much higher as the automobile speed goes higher. When the automobile speed reaches a certain level, the swingable portion 52 is turned to the lower solid-line position, so that no air flows in the direction of the arrow c, but all of the incoming air flows in the direction of the arrow b. If the swingable portion 52 were in the upper position at the time the automobile is running at a high speed, the cross-flow fan 4 would be subjected to a moment tending to turn the fan 4 clockwise due to the air flow in the direction of the arrow c. The cross-flow fan 4 would then rotate at a slower speed or would rotate in an opposite or clockwise direction. With the arrangement shown in FIG. 4, however, the swingable portion 52 disposed in the lower position in covering relation to the upper portion of the fan 4 prevents the fan 4 from being rotated clockwise.

Figure 5:
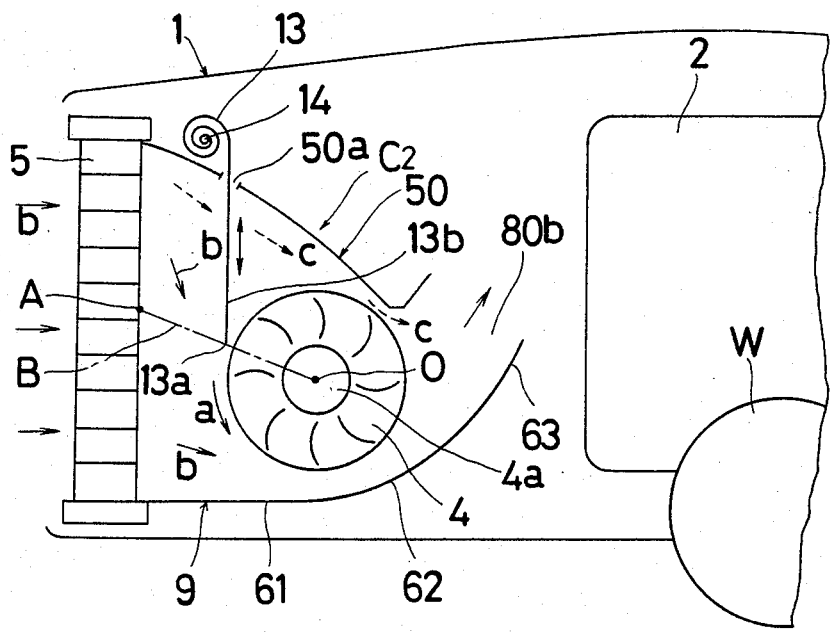

An engine cooling system according to still another embodiment shown in FIG. 5 differs from the engine cooling system of FIG. 4 in that there is a resilient curtain member 13 having an upper end portion coiled around a shaft 14 and a lower end 13 extending vertically through a slot 50a in an upper casing 50. The upper casing 50, the lower casing 9, and lateral casings (not shown) jointly constitute a casing assembly C2. The resilient curtain member 13 is made of extensible material or articulate material. The resilient curtain member 13 can be wound or unwound about the shaft 14 so that the lower end 13a can move vertically up and down. When the lower end 13a is in its lowermost position as shown, the resilient curtain member 13 has a straight vertical portion 13b extending substantially across half of an air duct formed in the casing assembly C2. The lower end 13a in the lowermost position is located on the straight line B or slightly therebelow.

The resilient curtain member 13 may be driven to move vertically by any suitable drive mechanism such as a hydraulic, vacuum, or electric drive mechanism. The lower end 13a is located in the lowermost position when the automobile runs at a certain speed (about 40 km/h.) as detected by a car speed sensor (not shown).

When the automobile is moving at low speeds or the engine is idling, the lower end 13a of the resilient curtain member 13 is retracted upwardly to the upper casing 50. The fan 4 rotates counterclockwise in the direction of the arrow a, and air drawn through the radiator 5 flows across the fan 4 in the directions of the arrows b, c and then is discharged out of an outlet 80b defined between the upper and lower casings 50, 9. When the automobile as it runs reaches a certain car speed, the car speed sensor is energized to lower the lower end 13a of the resilient curtain member 13 down to the position shown in FIG. 5. Then, no air flow acts on the upper portion of the fan 4, which is not subjected to any moment tending to turn the fan 4 clockwise.

In the embodiments of FIGS. 4 and 5, the casing assembly may be inverted to rotate the cross-flow fan 4 clockwise during operation. With such an alternative, the swingable portion 52 or the resilient curtain member 13 should be mounted on the lower casing 9 to prevent air flow from acting on the lower portion of the fan 4 while the automobile is running at medium or high speed. The direction of rotation of the fan 4 during normal operation should be detemined taking accouny of the space available in the engine compartment and possible interference with other engine accessaries.

With the arrangements shown in FIGS. 4 and 5, there is no moment applied to the cross-flow fan 4 tending to rotate the latter in an opposite direction while the automobile is travelling at medium and high speeds. When the automobile is running at low speeds or the engine is idling, the fan is supplied with air at a sufficient rate from the radiator to achieve a desired degree of cooling efficiency for protection against overheating of the engine.

Figure 6:
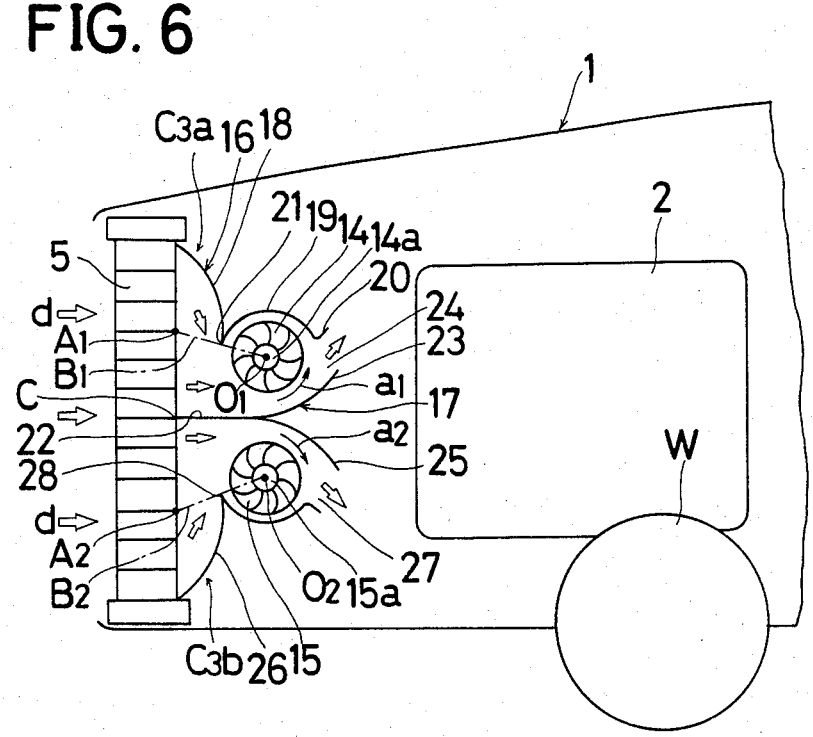

FIG. 6 illustrates an engine cooling system according to a still further embodiment of the present invention. The engine cooling system which is disposed between a radiator 5 and an engine 2 comprises a pair of vertically spaced cross-flow fans 14, 15 rotatable about shafts 14a, 15a in the directions of the arrows a1, a2, respectively, by motors (not shown) coupled to ends of the shafts 14a, 15a, respectively.

The engine cooling system also includes a pair of upper and lower casing assemblies C3a, C3b surrounding the fans 14, 15, respectively. The upper casing assembly C3a comprises an upper casing 16 disposed above the fan 4, a lower casing 17 disposed below the fan 4, and a pair of lateral casings (not shown). The upper casing 16 extends rearward from the upper end of the radiator 5 and is composed of a front curved portion 18, a central curved portion 19, and a rear outlet portion 20. The front and central curved portions 18, 19 are joined by a downwardly projecting edge 21 located on a straight line B1 connecting between an axis O1 of the fan shaft 14a and a point A1 on the radiator 5 which is vertically spaced from the upper end thereof by a distance equal to a quarter of the entire vertical dimension of the radiator 5, or slightly below the straight line B1. The lower casing 17 extends rearward from a vertically central point C on the radiator 5 and includes a horizontal straight portion 22 and a rear curved portion 23 extending obliquely upwardly from the horizontal straight portion 22. The rear outlet portion 20 of the upper casing 16 and the rear end of the rear curved portion 23 of the lower casing 17 jointly define an air flow outlet 24.

The lower casing assembly C3b is composed of an upper casing 25 positioned above the fan 15, a lower casing 26 positioned below the fan 15, and a pair of lateral casings (not shown). The upper casing 25 extends rearward from the central point C of the radiator 5 and is of a shape identical to that of the lower casing 17 of the upper casing assembly C3a, but inverted in installation. The upper casing 25 is attached to the lower casing 17 back to back. The lower casing 26 extends rearward from the lower end of the radiator 5 and is of an inverted configuration identical to the shape of the upper casing 16 of the upper casing assembly C3b. The lower casing 26 has an upwardly projecting edge 28 corresponding to the downwardly projecting edge 21 of the upper casing 16 and located on a straight line B2 connecting between an axis O2 of the fan shaft 15a and a point A2 on the radiator 5 which is vertically spaced from the lower end thereof by a distance equal to a quarter of the entire vertical dimension of the radiator 5, or slightly above the straight line B2. Accordingly, the upper and lower casing assemblies C3a, C3b are symmetrical in shape with respect to a horizontal plane passing through the central point C on the radiator 5.

Operation of the engine cooling system of FIG. 6 is as follows: When the engine 2 is operated and the fan drive motors are energized with the automobile at rest, the cross-flow fans 14, 15 are rotated in the directions of the arrows a1, a2 to draw air through the radiator 5 in the directions of the arrows d to cool the coolant in the radiator 5 and discharge air out of the air flow outlets 24, 27.

When the automobile starts running, air flows in the direction of the arrows d at a relatively higher speed. The speed of air flow becomes much higher as the automobile travels at high speeds. Since the fans 14, 15 are partly covered by the curved portions 19 of the upper and lower casings 16, 26 with the edges 21, 28 located on or exceeding the straight lines B1, B2, the fans 14, 15 are not subjected to any moment tending to rotate them in directions opposite to the directions a1, a2. Rather, the fans 14, 15 are assisted by the air flows in rotating at higher speeds. Therefore, the engine cooling efficiency of the engine cooling system is improved.

Figure 7:
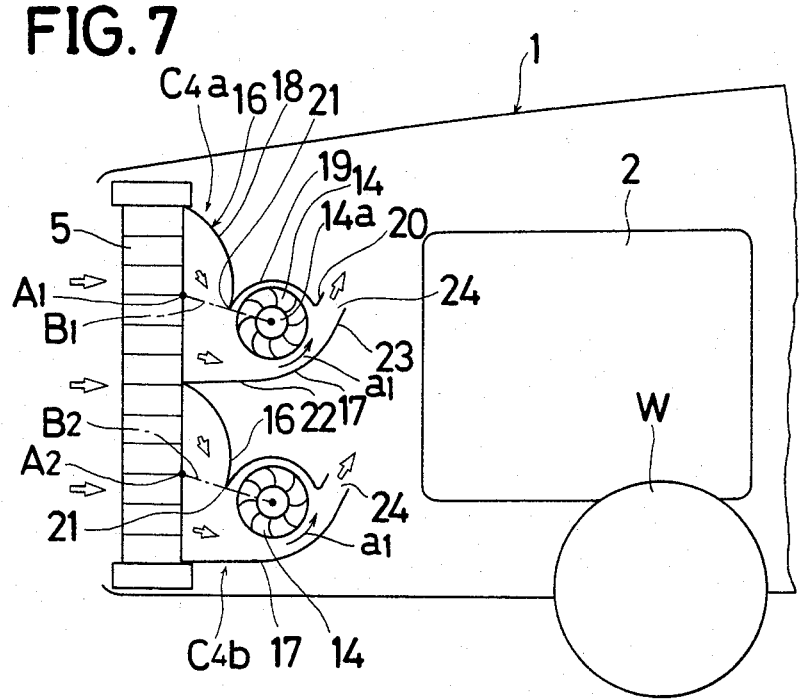

An engine cooling system according to another embodiment shown in FIG. 7 includes a pair of vertically spaced cross-flow fans 14, 14 housed in a pair of upper and lower casing assemblies C4a, C4b, respectively. The upper casing assembly C4a is identical in shape and position to the upper casing assembly C3a shown in FIG. 6. The lower casing assembly C4b is identical in shape to but positioned directly below the upper casing assembly C4a. The downwardly directed edges 21 of the upper and lower casings 16 are located on straight lines B1, respectively, passing through the points A1, A2 on the radiator 5. In operation, therefore, the cross-flow fans 14, 14 rotate in the same direction of the arrow a1.

Figure 8:
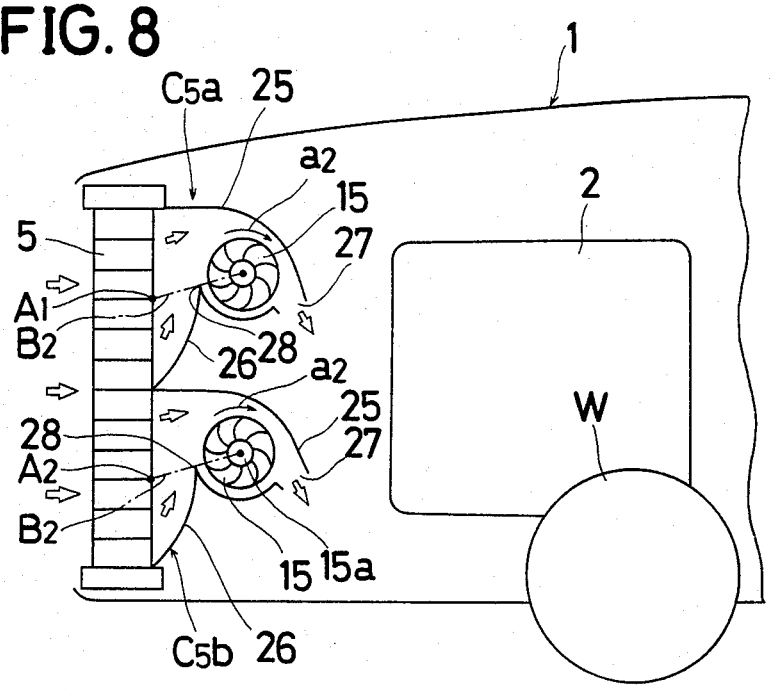

FIG. 8 is illustrative of an engine cooling system according to still another embodiment of the present invention. The engine cooling system has a pair of cross-flow fans 15, 15 arranged in vertically spaced relationship and a pair of upper and lower casing assemblies C5a, C5b housing the cross-flow fans 15, 15, respectively. Each of the upper and lower casing assemblies C5a, C5b is identical in configuration to the lower casing assembly C3b shown in FIG. 6. In operation, the cross-flow fans 15, 15 rotate in the direction of the arrow a2.

Figure 9:
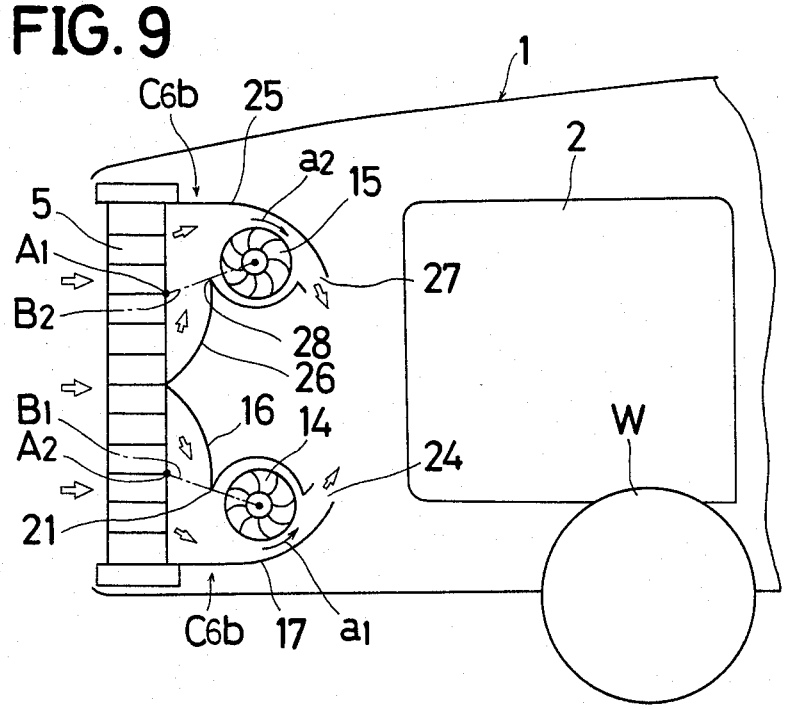

According to a still further embodiment illustrated in FIG. 9, an engine cooling system includes a pair of upper and lower cross-flow fans 15, 14 and a pair of upper and lower casing assemblies C6a, C6b housing the fans 15, 14, respectively. The upper and lower casing assemblies C6a, C6b are identical in construction to the lower and upper casing assemblies C3b, C3a, respectively.

In the embodiments shown in FIGS. 6 through 9, two cross-flow fans are employed for producing an air flow through the radiator. However, three or more cross-flow fans may be installed if enough space is available. The two or more cross-flow fans can produce an increased rate of air flow through the radiator for a higher engine cooling efficiency. The engine cooling system is of practical advantage since it does have the space and durability limitations which conventional engine systems have suffered from.

Although certain preferred embodiments have been shown and described, it should be understood that many changes and modifications may be made therein without departing from the scope of the appended claims.

What is claimed is:

1. An engine cooling system for an automotive vehicle including a vehicle body, comprising:
   (a) a radiator adapted to be mounted on the vehicle body;
   (b) a cross-flow fan disposed behind said radiator and having a shaft;
   (c) a casing assembly connected to said radiator and including an upper casing disposed above said cross-flow fan, a lower casing disposed below said cross-flow fan, and a pair of lateral casings disposed one on each side of said cross-flow fan; and
   (d) a motor connected to one end of said shaft for driving said cross-flow fan to create an air flow through said radiator and said casing assembly,
   wherein said upper casing includes a first curved portion extending from an upper end of said radiator, a second curved portion extending from said first curved portion in partly covering relation to said corss-flow fan, and a third end portion extending from said second curved portion, said first and second curved portions being joined by a downwardly projecting edge located on a straight line connecting between a vertically central point on said radiator and an axis of said shaft of said cross-flow fan, said lower casing including a first straight portion extending from a lower end of said radiator, a second curved portion extending from said first straight portion, and a third end portion extending from said second curved portion, said third end portions of said upper and lower casings jointly constituting an air flow outlet.

2. An engine cooling system according to claim 1, wherein one of said upper and lower casings having a portion covering a portion of said cross-flow fan for preventing an air flow from counteracting rotation of said cross-flow fan.

3. An engine cooling system according to claim 1, including an engine coolant temperature sensor and a compressor high-pressure sensor for controlling the RPM of said motor.

4. An engine cooling system for an automotive vehicle having a vehicle body, comprising:
(a) a radiator adapted to be mounted on the vehicle body;
(b) a cross-flow fan disposed behind said radiator and having a shaft;
(c) a casing assembly connected to said radiator and including an upper casing disposed above said cross-flow fan, a lower casing disposed below said cross-flow fan, and a pair of lateral casings disposed one on each side of said cross-flow fan for guiding an air flow having passed through said radiator;
(d) a motor connected to one end of said shaft for driving said cross-flow fan to create an air flow through said radiator and said casing assembly; and
(e) covering means for covering a portion of said cross-flow fan to prevent an air flow from counteracting rotation of said cross-flow fan when the automotive vehicle runs at a speed higher than prescribed speed, wherein said covering means comprises a swingable portion of said upper casing, said swingable portion being substantially triangular in side elevation and angularly movable about a hinge between a first portion in which said swingable portion partly covers said cross-flow fan and a second position in which said swingable portion is located away from said cross-flow fan to define a passage of air flow along said cross-flow fan.

5. An engine cooling system for an automotive vehicle having a vehicle body, comprising:
(a) a radiator adapted to be mounted on the vehicle body;
(b) a plurality of vertically spaced cross-flow fans disposed behind said radiator and having respective shafts;
(c) a plurality of casing assemblies connected to said radiator and arranged vertically in surrounding relation to said cross-flow fans, respectively, each of said casing assemblies including an upper casing disposed above said cross-flow fan, a lower casing disposed below said cross-flow fan, and a pair of lateral casings disposed one on each side of said cross-flow fan for guiding an air flow having passed through said radiator; and
(d) a motor connected to one end of said shaft for driving said cross-flow fan to create an air flow through said radiator and said casing assembly; wherein
each casing assembly is connected to said radiator such that said upper and lower casings collectively divide said radiator vertically into a plurality of radiator segments of equal height, said plurality of radiator segments being equal in number to and respectively corresponding to said cross-flow fans; and
one of said upper and lower casings of each said casing assembly further comprises a first curved portion extending from said radiator, a second curved portion extending from said first curved portion in partly covering relation to its respective cross-flow fan, and a third end portion extending from said second curved portion, said first and second curved portions being joined by a projecting edge located on a straight line extending between a vertically central point on the corresponding radiator segment and an axis of said shaft of said corresponding cross-flow fan.

6. An engine cooling system according to claim 5, wherein the other of said upper and lower casings of each said casing assembly further comprises a first straight portion extending from said radiator, a second curved portion extending from said first straight portion, and a third end portion extending from said second curved portion, said third end portions of said upper and lower casings jointly consituting an air flow outlet.

7. An engine cooling system for an automotive vehicle having a vehicle body, comprising:
(a) a radiator adapted to be mounted on the vehicle body;
(b) a cross-flow fan disposed behind said radiator and having a shaft;
(c) a casing assembly connected to said radiator and including an upper casing disposed above said cross-flow fan, a lower casing disposed below said cross-flow fan, and a pair of lateral casings disposed one on each side of said cross-flow fan for guiding an air flow having passed through said radiator;
(d) a motor connected to one end of said shaft for driving said cross-flow fan to create an air flow through said radiator and said casing assembly; and
(e) covering means for covering a portion of said cross-flow fan to prevent an air flow from counteracting rotation of said cross-flow fan when the automotive vehicle runs at a speed higher than a prescribed speed, wherein said covering means comprises a resilient member having one coiled end and an opposite end retractably extending vertically through said upper casing in the vicinity of said cross-flow fan.

8. An engine cooling system for an automotive vehicle including a vehicle body, comprising:
(a) a radiator adapted to be mounted on the vehicle body;
(b) a cross-flow fan disposed behind said radiator and having a shaft;
(c) a casing assembly connected to said radiator and including an upper casing disposed above said cross-flow fan, a lower casing disposed below said cross-flow fan, and a pair of lateral casings disposed one on each side of said cross-flow fan; and
(d) a motor connected to one end of said shaft for driving said cross-flow fan to create an air flow through said radiator and said casing assembly,
wherein said upper casing includes a first curved portion extending from an upper end of said radiator, a second curved portion extending from said first curved portion in partly covering relation to said cross-flow fan, and a third end portion extending from said second curved portion, said first and second curved portions being joined by a downwardly projecting edge located on a straight line connecting between a vertically central point on said radiator and an axis of said shaft of said cross-flow fan.

9. An engine cooling system for an automotive vehicle including a vehicle body, comprising:
  (a) a radiator adapted to be mounted on the vehicle body;
  (b) a cross-flow fan disposed behind said radiator an having a shaft;
  (c) a casing assembly connected to said radiator and including an upper casing disposed above said cross-flow fan, a lower casing disposed below said cross-flow fan, and a pair of lateral casings disposed one on each side of said cross-flow fan; and
  (d) a motor connected to one end of said shaft for driving said cross-flow fan to create an air flow through said radiator and said casing assembly, wherein one of said upper and lower casings includes a first curved portion extending from a first end of said radiator, a second curved portion extending from said first curved portion in partly covering relation to said cross-flow fan, and a third end portion extending from said second curved portion, said first and second curved portions being joined by a projecting edge located on a straight line connecting between a vertically central point on said radiator and an axis of said shaft of said cross-flow fan.

10. An engine cooling system according to claim 9, wherein the other of said upper and lower casings further comprises a first straight portion extending from a second end of said radiator, a second curved portion extending from said first straight portion, and a third end portion extending from said second curved portion, said third end portions of said upper and lower casings jointly constituting an air flow outlet.

* * * * *